US010089204B2

(12) United States Patent
Hare et al.

(10) Patent No.: US 10,089,204 B2
(45) Date of Patent: Oct. 2, 2018

(54) SYSTEM LEVEL FAULT DIAGNOSIS FOR THE AIR MANAGEMENT SYSTEM OF AN AIRCRAFT

(71) Applicants: Hamilton Sundstrand Corporation, Windsor Locks, CT (US); The University of Connecticut, Storrs, CT (US)

(72) Inventors: James Z. Hare, Coventry, CT (US); Shalabh Gupta, Manchester, CT (US); Nayeff A. Najjar, Willington, CT (US); Paul M. D'Orlando, Simsbury, CT (US); Rhonda Dawn Walthall, Escondido, CA (US)

(73) Assignees: HAMILTON SUNDSTRAND CORPORATION, Windsor Locks, CT (US); THE UNIVERSITY OF CONNECTICUT, Storrs, CT (US)

( * ) Notice: Subject to any disclaimer, the term of this patent is extended or adjusted under 35 U.S.C. 154(b) by 46 days.

(21) Appl. No.: 14/687,112

(22) Filed: Apr. 15, 2015

(65) Prior Publication Data
US 2016/0306725 A1    Oct. 20, 2016

(51) Int. Cl.
G06F 11/00 (2006.01)
G06F 11/22 (2006.01)
G06F 11/30 (2006.01)
G06F 11/07 (2006.01)

(52) U.S. Cl.
CPC .......... *G06F 11/2263* (2013.01); *G06F 11/07* (2013.01); *G06F 11/3013* (2013.01); *G06F 11/3058* (2013.01)

(58) Field of Classification Search
CPC ............... G06F 11/2263; G06F 11/079; G05B 23/0275–23/0283
See application file for complete search history.

(56) References Cited

U.S. PATENT DOCUMENTS

| 7,455,099 | B2 | 11/2008 | Osborn et al. |
| 7,734,400 | B2 | 6/2010 | Gayme et al. |
| 8,437,904 | B2 | 5/2013 | Mansouri et al. |
| 8,620,519 | B2 | 12/2013 | Mukherjee et al. |
| 2010/0030521 | A1* | 2/2010 | Akhrarov ............... G06K 9/622 702/182 |

(Continued)

FOREIGN PATENT DOCUMENTS

| CA | 2781029 A1 | 12/2012 |
| CN | 102945311 A * | 2/2013 |
| EP | 2629201 B1 * | 12/2017 .......... G06F 11/0739 |

OTHER PUBLICATIONS

Google Translation of EP 2629201 B1, Dec. 13, 2017 (Year: 2017).*

(Continued)

*Primary Examiner* — Michael C Maskulinski
(74) *Attorney, Agent, or Firm* — Cantor Colburn LLP

(57) ABSTRACT

A hierarchical fault detection and isolation system, method, and/or computer program product that facilitates fault detection and isolation in a complex networked system while reducing the computational complexity and false alarms is provided. The system, method, and/or computer program product utilizes a system level isolation and detection algorithm and a diagnostic tree to systematically isolate faulty sub-systems, components, etc. of the complex networked system.

2 Claims, 6 Drawing Sheets

(56) References Cited

U.S. PATENT DOCUMENTS

| | | | |
|---|---|---|---|
| 2010/0318837 A1* | 12/2010 | Murphy | G06F 11/1461 714/4.1 |
| 2012/0005534 A1* | 1/2012 | Li | G06F 11/008 714/26 |
| 2012/0303150 A1* | 11/2012 | Krishnaswamy | G05B 23/0251 700/110 |
| 2013/0191681 A1* | 7/2013 | Moiseev | G05B 9/03 714/2 |
| 2015/0033080 A1* | 1/2015 | Lee | G06F 11/0766 714/39 |
| 2016/0139977 A1* | 5/2016 | Ashani | G06F 11/0706 714/26 |
| 2016/0305865 A1* | 10/2016 | Silva | G01N 17/008 |
| 2016/0320291 A1* | 11/2016 | Najjar | G01N 17/008 |

OTHER PUBLICATIONS

Letourneau et al., "Data Mining to Predict Aircraft Component Replacement", Nov./Dec. 1999, IEEE Intelligent Systems & their Applications, pp. 59-66 (Year: 1999).*

Namburu et al., "Data-Driven Modeling, Fault Diagnosis and Optimal Sensor Selection for HVAC Chillers", IEEE Transactions on Automation Science and Engineering, vol. 4, No. 3, Jul. 2007, pp. 469-473 (Year: 2007).*

\* cited by examiner

SYSTEM LEVEL FAULT DIAGNOSIS FOR THE AIR MANAGEMENT SYSTEM OF AN AIRCRAFT

BACKGROUND

The present disclosure relates generally to fault detection and isolation in complex networked systems and more specifically, to system level fault diagnosis for an air management system of an aircraft.

In general, advancements in sensing and control technologies have facilitated the development of complex networked systems. Complex networked systems consist of multiple sub-systems that in turn consist of components, heterogeneous sensing devices, and feedback controllers interconnected through various electrical, mechanical, hydraulic or pneumatic connections. The complex interconnections and feedback control loops of the complex networked systems make fault detection and isolation a very challenging task.

For example, a complex networked system, such as an air management system of an aircraft, controls and supplies pressurized air to the aircraft and consists of multiple sub-systems. If the complex interconnections and feedback control loops include a faulty component, the faulty component yields off-nominal outputs that are inputs to other coupled components. In turn, the other coupled components that are otherwise healthy produce off-nominal outputs, thus causing unwanted false-alarms. Furthermore, due to off-nominal inputs, the healthy components are driven beyond their normal operating conditions that may lead to cascading failures. Also, the built in controller will use the faulty signals and will mask the faults present in the system for continual operation.

SUMMARY

Embodiments include a method, system, and computer program product for accumulating sensor data from a plurality of sensor utilizing a physics based model containing differential equations that describe components and sub-systems within a complex networked system; selecting, by an algorithm, a sub-set of best sensors to capture effects of each failure mode from a plurality of sensors, each sensor being associated with at least one of the components and the sub-systems within the complex networked system; training a plurality of neural networks for each subsystem and component within the complex networked system to detect and identify faults within the sensor data; and in response to the sub-set of best sensors being selected and the plurality of neural networks being trained for each subsystem and component, executing the algorithm to detect and isolate the faults within the sensor data.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to a hierarchical fault detection and isolation system, method, and/or computer program product (herein diagnosis system) that facilitates fault detection and isolation in a complex networked system while reducing the computational complexity and false alarms. The diagnosis system utilizes a system level detection and isolation algorithm with a diagnostic tree to systematically isolate faulty sub-systems, then faulty components, etc. of the complex networked system.

Figure 1:
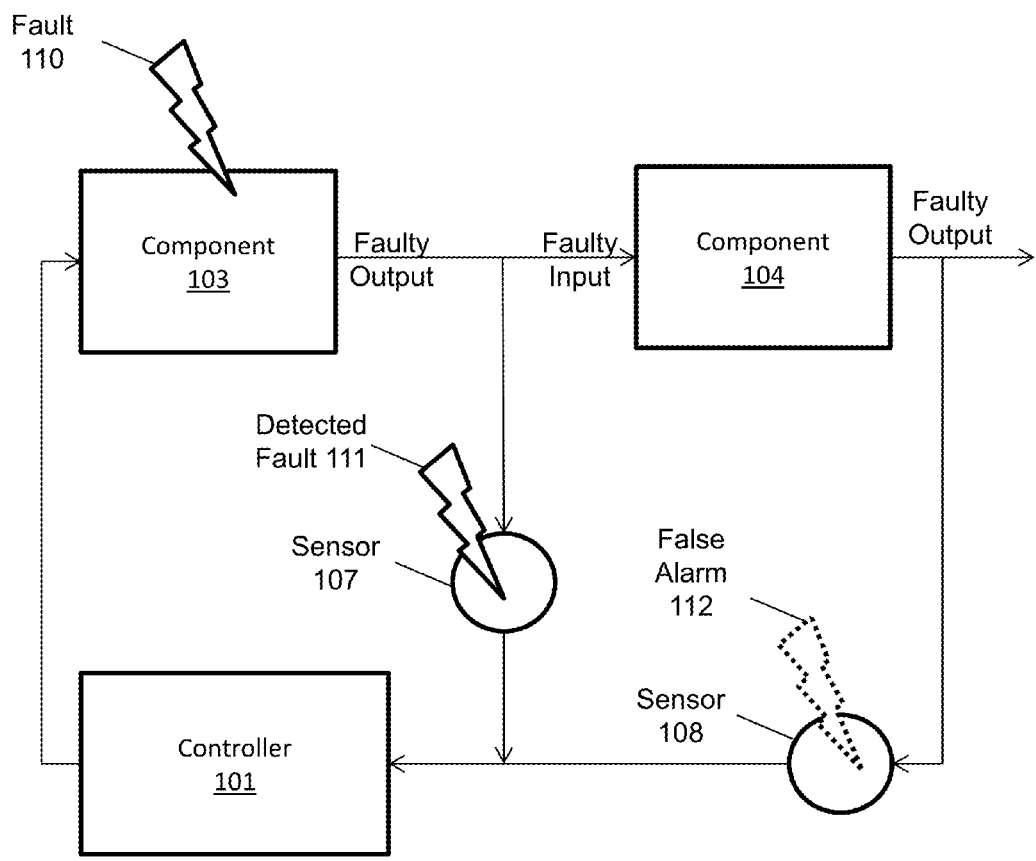
FIG. 1 depicts a diagnosis system in accordance with an embodiment.

Turning now to FIG. 1, a diagnosis system is generally shown in accordance with an embodiment. The diagnosis system includes a complex networked system 100 comprising a controller 101 that monitors a status of component 103 and a status of component 104 through sensors 107, 108.

In operation, FIG. 1 further illustrates the challenging aspects of fault detection and isolation in the complex networked system 100, such as problems encountered due to multitude of interconnections between the components 103 and 104, and sensors 107 and 108. For example, a fault 110 in the component 103 yields a faulty output that produces a detected fault 111 by the sensor 107 and in turn forms a faulty input to the component 104. This leads to a generation of another faulty output by the component 104, which is otherwise healthy, and a false alarm 112 (e.g., a cascading failure) detected by the sensor 108. In this way, the controller 101 receives from the sensors 107 and 108, both the detected fault 111 and the false alarm 112.

To distinguish between the detected fault 111 and the false alarm 112, the diagnosis system employs a system-level fault detection and isolation approach. For instance, the diagnosis system employs a system level detection and isolation algorithm to detect and isolate the faulty component 103. In this approach, a diagnostic tree is constructed using the whole diagnosis system as the first node while the sub-systems and components form the following nodes at different branches (e.g., component 103 and component 104 can be a two nodes in that branch off of the diagnosis system). At each node of the tree, a neural network model is constructed by the diagnosis system based on optimal sensor data that can capture the healthy characteristics of the node even in the event of fault(s) present in other sub-systems. This neural network model then acts as a binary classifier to detect if a fault is present within the subsystem/component. The system level detection and isolation algorithm runs in a top-down fashion by first detecting and isolating a subsystem containing the fault and then isolating the corresponding faulty component within that subsystem to reduce the false alarms and the computational complexity while maintaining a high detection rate.

The system level detection and isolation algorithm utilizes a diagnostics method that is based upon a system-theoretic approach to detect and isolate a faulty component within a complex networked system 100. Further, the system level detection and isolation algorithm uses the concept of a hierarchical diagnostic tree to first isolate the subsystem that contains the fault and then isolate the faulty component itself. The diagnostic tree is constructed with the complex networked system 100 as a whole as the root node. At a next level, each node represents a subsystem within the complex networked system 100. At a bottom level, the terminal nodes represent the components of the sub-systems. This approach can be extended to include the fault modes of the components as the terminal node.

Figure 2:
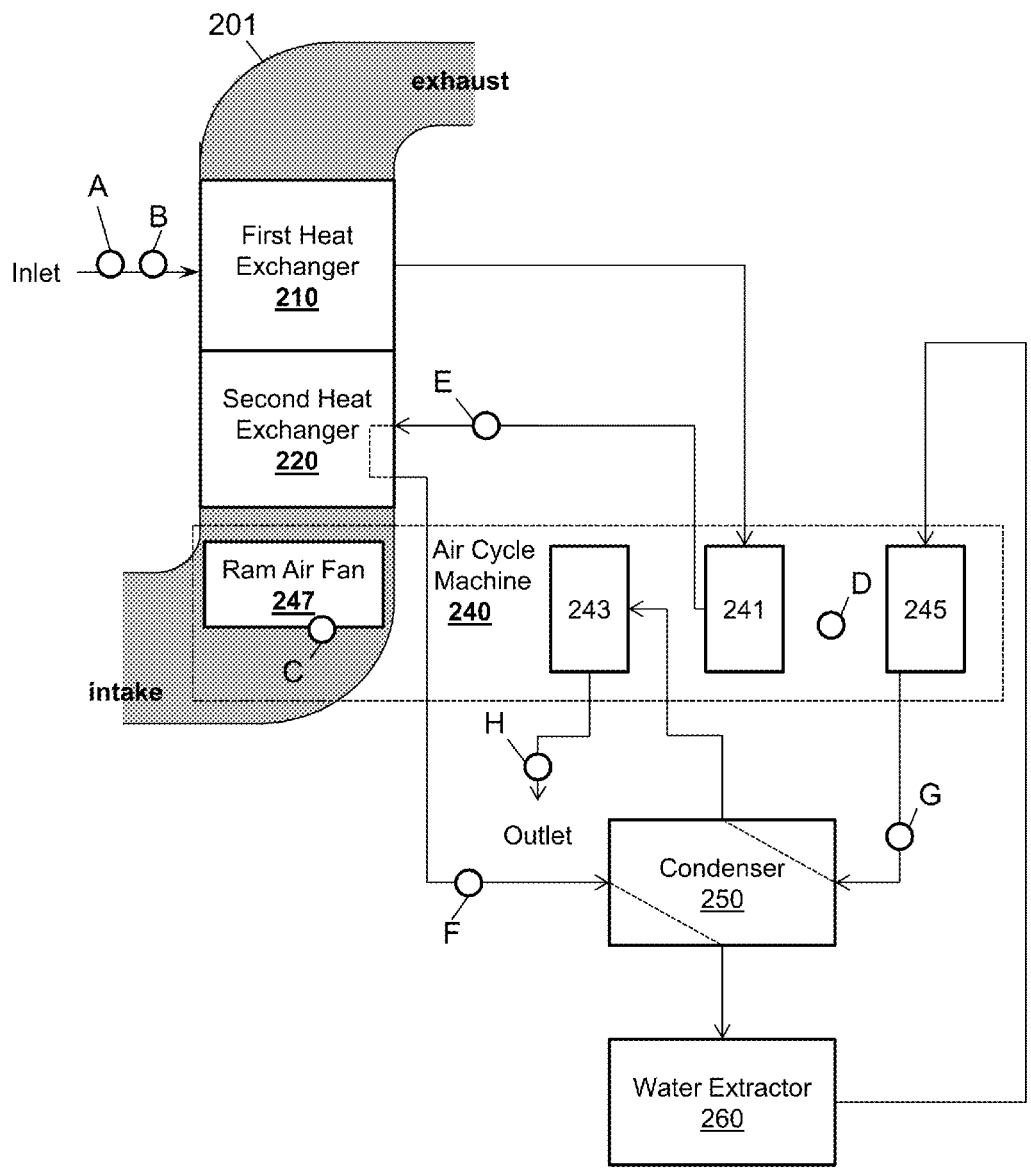
FIG. 2 depicts a schematic of a diagnosis system in accordance with an embodiment.

For ease of explanation, the diagnosis system and the complex networked system 100 will now be described with reference to an air management system of an aircraft. That is, as shown in FIG. 2, the air management system 200 may be viewed as an embodiment of the complex networked system 100. In particular, the air management system 200 is an integrated thermal control system that consists of two main parallel sub-systems, each of which can be an environmental control sub-system that provides temperature, humidity, and pressure controlled air to a cabin of an air craft as further described below with respect to FIG. 3. For the safety and comfort of occupants, it is critical to ensure that the air management system 200 operates in a healthy condition. Further, in absence of an onboard fault diagnosis tool, the air management system 200 has to be scheduled for periodic maintenance that causes unwanted interruption of the aircraft operation (possibly for several days), and incurs huge financial costs. The diagnosis system provides a reliable fault diagnosis methodology for the air management system 200 that generates early warnings of failures and enable condition based maintenance.

The air management system 200 (e.g., an embodiment of complex networked system 100) includes a shell 201, a first heat exchanger 210, a second heat exchanger 220, an air cycle machine 240 (that can include a compressor 241, turbines 243 and 245, and a fan 247), a condenser 250, and a water extractor 260, each of which are connected via tubes, pipes, ducts, valves, and the like, such that bleed air is accepted at Inlet from a low-pressure location of an engine of an aircraft at an initial flow rate, pressure, and temperature and provided to Outlet (e.g., cabin, flight deck, etc.) at a final flow rate, pressure, and temperature. In this way, the credentials of the bleed air at the Outlet (e.g., the final flow rate, pressure, and temperature) enable the aircraft to receive pressurized and cooled air from the air management system 200.

The shell 201 is an example of a ram chamber of a ram system which uses dynamic air pressure created by an aircraft in motion to increase a static air pressure inside of the shell.

Heat exchangers (e.g., a first heat exchanger 210 and a second heat exchanger 220) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced through the shell (e.g., via push or pull methods) is blown across the heat exchanger at a variable cooling airflow to control the final air temperature of the bleed air.

The air cycle machine 240 is a mechanical device that regulates a pressure of a medium (e.g., increasing the pressure of a gas or bleed air). Examples of a compressor include centrifugal, diagonal or mixed-flow, axial-flow, reciprocating, ionic liquid piston, rotary screw, rotary vane, scroll, diaphragm and air bubble compressors. Further, compressors are typically driven by an electric motor or a steam or a gas turbine (e.g., turbines 243 and 245). That is, the turbines 243 and 245 are mechanical devices that drive the compressor 241. The compressor 241 is a mechanical device that regulates a pressure of the bleed air received from the first heat exchanger 210. A fan 247 can be included in the air cycle machine and is a mechanical device that can force via push or pull methods air through the shell 201 across the heat exchangers 210, 220 at a variable cooling airflow. The turbines 243 and 245 and the compressor 241 together regulate pressure and illustrate, for example, that the air cycle machine 240 may operate as a four-wheel air cycle machine. Note that while FIG. 2 illustrates example orientations of the air cycle machine 240 and its components with respect to the shell 201, the first heat exchanger 210, and the second heat exchanger 220, other orientations may be utilized.

The condenser 250, which is an example of a heat exchanger as described above, is a device or unit used to condense a substance (e.g., bleed air) from its gaseous to its liquid state, typically by cooling it such that latent heat is given up by the substance and transferred to a condenser coolant. Condensers are typically heat exchangers. The water extractor 260 is a mechanical device that performs a process of taking water from any source, such as bleed-air, either temporarily or permanently.

Valves, while not shown in FIG. 2, are devices that regulate, direct, and/or control a flow of a medium (e.g., gases, liquids, fluidized solids, or slurries, such as bleed air) by opening, closing, or partially obstructing various passageways within the tubes, pipes, etc. of the air management system 200. Valves may be operated by actuators such that the flow rates of any medium in any portion of the air management system 200 may be regulated to a desired value. For example, a valve at the intake of the shell 210 enables the intake of ambient air external to the aircraft into the shell 201, such that the ambient air may pass through the first and second heat exchangers 210. 220 and cool the bleed air before exiting as an exhaust (e.g., the method of intake may be a pull method by a fan driven by a shaft of the air cycle machine 240 or a ram method).

In addition, the air management system 200 (e.g., an embodiment of complex networked system 100) includes a plurality of sensors A-H. In general, a sensor is any device that detects events or changes in quantities and provides a corresponding output, e.g., as an electrical or optical signal. Examples of quantities that a sensor can detect include but are not limited to light, motion, temperature, magnetic fields, gravity, humidity, moisture, vibration, pressure, electrical fields, sound, and other physical aspects of an external environment. With respect to the air management system 200, the sensors A-H detect status information of the different component and provide that information to a processing device of the diagnosis system (e.g., a controller 101 or a processing device 500 as further described below with respect to FIG. 5). A first sensor is an inlet pressure sensor A. A second sensor is an inlet mass flow sensor B. A third sensor is a ram air fan speed sensor C. A fourth sensor is an air cycle machine speed sensor D. A fifth sensor is a compressor temperature inlet sensor E. A sixth sensor is a second heat exchanger outlet temperature sensor F. A seventh sensor is condenser inlet temperature sensor G. An eighth sensor is an environmental control system outlet temperature sensor H. Further, since these sensors A-H are also used to control the components of the air management system 200 to produce the desired temperature and pressure at the outlet, accurate measurements are needed for the comfort of the passengers onboard the aircraft. In the following examples, the sensors A-H can be one of three types of sensors: a flow sensor, a temperature sensor, and a speed sensor. The flow sensor measures the flow rate of the bleed air entering or exiting a component of the air management system 200. The temperature sensor, such as a condenser inlet temperature sensor, measures the temperature of the bleed air exiting the air cycle machine 240 and entering the condenser 250. The speed sensors, such as the air cycle machine speed sensor, measure the revolutions per minute of the air cycle machine 240.

As noted above, the air management system 200 can consist of two parallel environmental control sub-systems. For example, FIG. 3 depicts a simplified hierarchical view 200 of the air management system 200, which allows for systematic elimination of healthy components through the fault isolation mechanism at a higher level.

Figure 3:
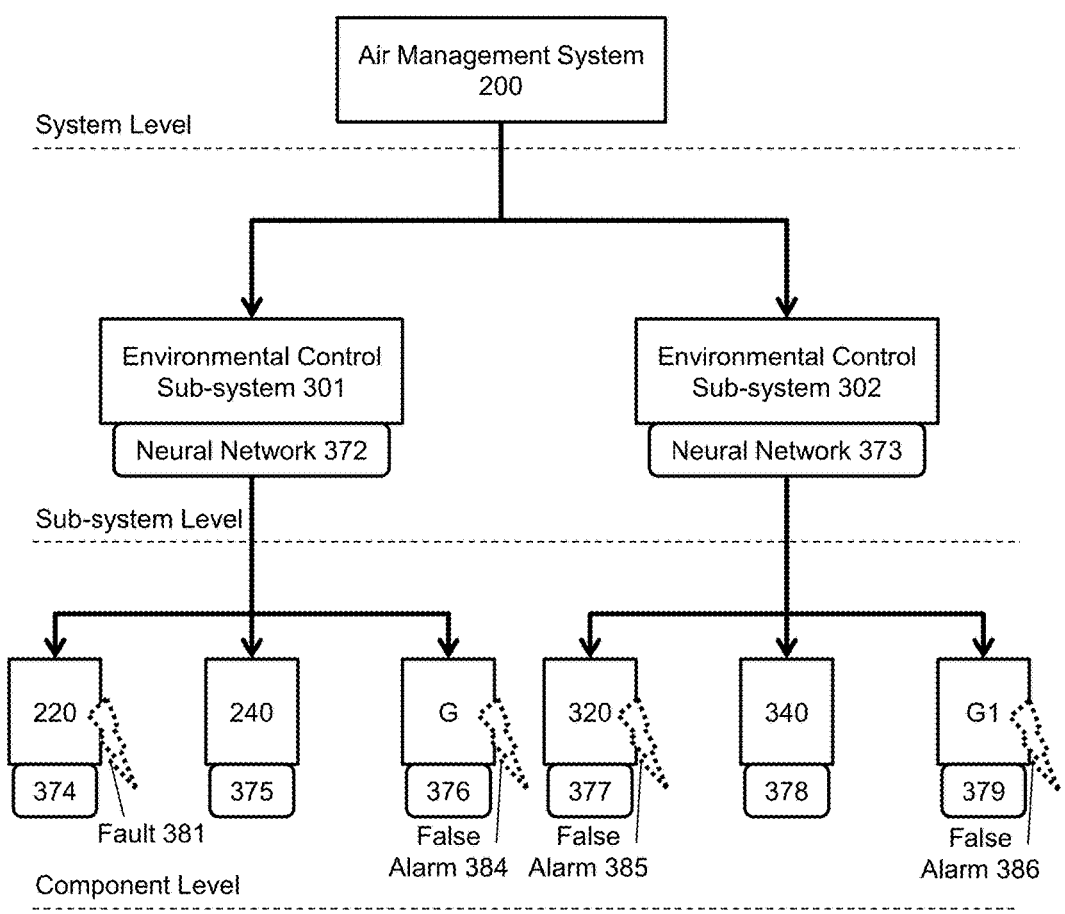
FIG. 3 depicts an illustrative example of where false alarms can appear as a result of an actual fault.

FIG. 3 includes a system level that comprises an on top or first level node, i.e., the air management system 200; a sub-systems level comprises two second level nodes, i.e., environmental control sub-system 301 and environmental control sub-system 302; and a component level that comprises a plurality of third that correspond to the components of the environmental control sub-systems 301, 302, i.e., exchangers, air cycle machines, sensors, etc. In this example, the environmental control sub-system 301 includes a first heat exchanger 210, a second heat exchanged 220, an air cycle machine 240 (that includes a compressor 241 and turbines 243 and 245), a condenser 250, a water extractor 260, and sensors A-H, while the parallel environmental control sub-system 302 includes similar components. For ease of explanation, the component level of FIG. 3 illustrates the second heat exchanger 220, the air cycle machine 240, and the sensor G for the environmental control sub-system 301 and parallel components of a second heat exchanger 320, an air cycle machine 340, and a sensor G1 for the environmental control sub-system 302.

FIG. 3 also includes a plurality of neural networks, each of which being associated with a particular node. For instance, neural networks 372 and 373 are respectively associated with the environmental control sub-systems 301 and 302, while neural networks 374-379 are associated with the second heat exchanger 220, the air cycle machine 240, the sensor G, the second heat exchanger 320, the air cycle machine 340, and the sensor G1, respectively. That is, each neural network 372-379 can be a black box model constructed at each node of a tree for binary classification of that node as healthy or faulty. The neural networks 372-379 also provide ease of implementation in real-time applications. Each neural network 372-379 utilizes a model that is trained via data received from a selected set of readings from one or more of the sensors (e.g., A-H) to detect and isolate a faulty node. They are trained using, for example, data generated while the particular component is healthy. This data can also include scenarios when all of the other components in the air management system are faulty as well capture the behavior of the healthy component under off nominal input conditions. In this way, each neural network 372-379 reduces the computational complexity by eliminating healthy branches of the tree to reduce false alarms through subsystem and facilitate component isolation.

As further illustrated in FIG. 3, a fault 381 can generate a series of false alarms 384-386 at the component level (lowest level for FIG. 3). This can lead to a large ambiguity of faulty components. However, through the implementation of the system level detection and isolation algorithm, the fault 381 will first be detected in neural network 372. Then the implementation of the system level detection and isolation algorithm will move down the tree to check for the faulty component. The other side of the tree with neural network 373 will not detect this fault since its subsystem itself is operating correctly. This allows for false alarms 385 and 386 to be eliminated and the correct fault to be detected without ambiguity. Once the neural network 372 detects the fault, the algorithm moves down the tree and initiates neural networks 374, 375, and 376, which act at the component level. These neural networks are trained to correctly isolate a faulty component. Thus this process will detect and isolate fault 381 at neural network 374 while eliminating false alarm 384.

As one embodiment of this structure the second heat exchanger 220 can be a plate first heat exchanger built with light weight plates and fins stacked over each other so as to dispose heat within the environmental control sub-system 301 to the ram air exiting the aircraft. Due to several factors including chemical reactions, corrosion, biological multiplications and freezing, a flow of the second heat exchanger 220 is obstructed causing a phenomenon known as fouling (e.g., fault 381). The air cycle machine 240 on the other hand consists of that compressor and two turbines that are used to compress and expand the bleed air to help aid in temperature and pressure control. Due to an unbalanced load distribution along the shaft, the air cycle machine 240 is prone to shutting down, which results in a loss of rotation and causes an increase in a temperature of the bleed air output by the environmental control sub-system 301.

Figure 4:
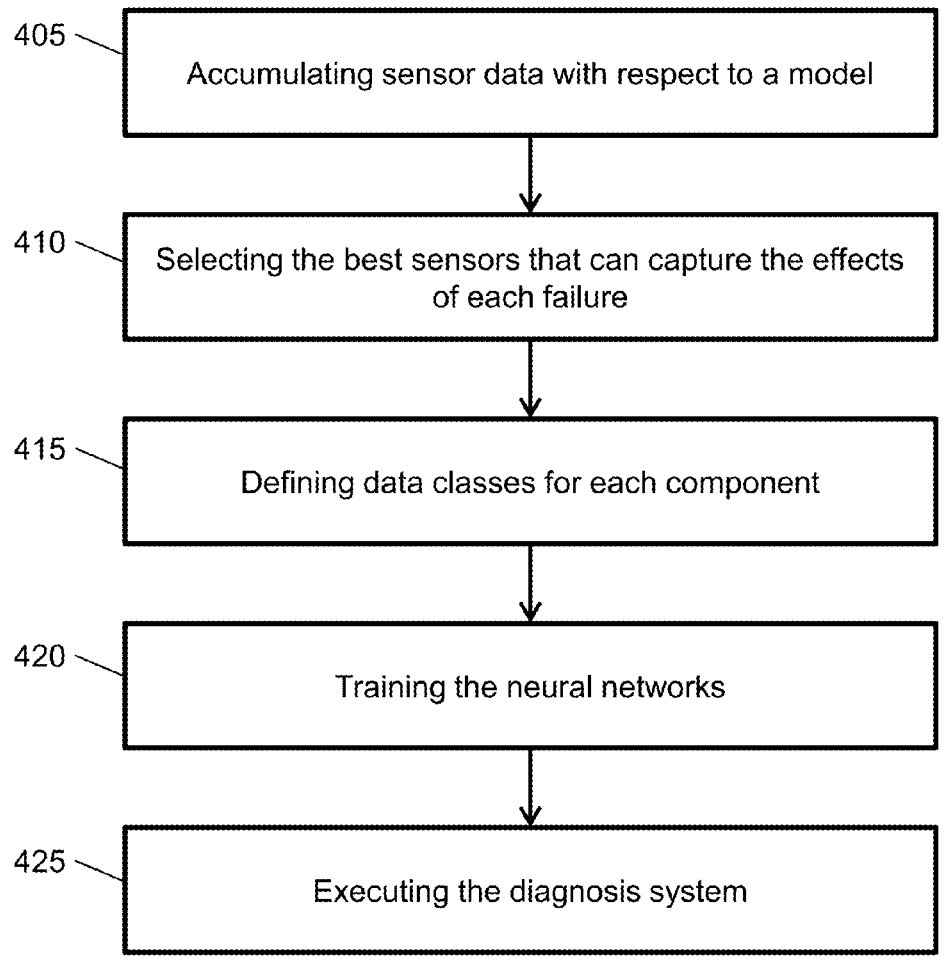
FIG. 4 illustrates a process flow of a diagnosis system in accordance with an embodiment.

In view of the above, the diagnosis system and the air management system 200 will now be described with respect to FIG. 4. FIG. 4 illustrates a process flow 400 of the diagnosis system in accordance with an embodiment.

Process flow 400 begins at block 405 where sensor data is generated and/or accumulated utilizing an experimentally validated model of the air management system 200. The model is a detailed physics-based model containing the differential equations that describe the various components and sub-systems within the air management system 200. For example, to generate data for the model, each failure listed in Table 1 is injected into the model when the aircraft is on the ground and the time series data of 119 parameters are recorded. These parameters include the sensors in

TABLE 1

COMPONENTS AND FAILURES CONSIDERED

| Components | Failure Modes |
| --- | --- |
| Air Cycle Machine 240 | Shutdown |
| Air Cycle Machine 340 | Shutdown |
| Second Heat Exchanger 220 | Fouling 20%, 40% |
| Second Heat Exchanger 320 | Fouling 20%, 40% |
| Flow Sensor B | Bias 10 PPM, 20 PPM |
| Flow Sensor B3 | Bias 10 PPM, 20 PPM |
| Condenser Inlet Temperature Sensor G | Bias −20° F., −30° F. |
| Condenser Inlet Temperature Sensor G3 | Bias −20° F., −30° F. | environmental control sub-systems 301 and 302 as well as the various other flight condition parameters. Furthermore, 600 samples of data are generated with sampling rate of 1 sample/second for a regular day flight condition (Tamb=45 F), and all measurements are recorded while the aircraft is on the ground at sea level. The first 300 seconds are ignored due to transient behaviors, while the next 300 seconds of data are used for training and testing. This allows for a steady-state analysis of the system parameters and is a practical window to test the state of the aircrafts health to provide early detection before the aircraft has taken off. Once the data has been generated, 25 dB signal-to-noise ratio additive white Gaussian noise is added to mimic real life situations.

With the sensor data accumulated, the process flow 400 then proceeds to block 410 where the system level detection and isolation algorithm selects the best sensors that can capture the effects of each failure mode by generating a dependency matrix. The dependency matrix is constructed with the different failure modes as the rows and the sensors that generate the measurements as the columns. For each failure mode, the measurement data from each sensor is compared with the corresponding nominal data to determine which sensors capture the failure mode effects. If the statistical moments (mean/standard deviation) derived from the residuals between the faulty vs healthy data exceed a certain threshold then it is assumed that the sensor readings can capture the failure mode and a 1 is placed under the corresponding failure mode and the sensor, while a 0 is placed when no separation is indicated in the sensor measurements. Subsequently, the dependencies within the air management system can be understood via observing the isolated failures and ambiguity groups in the dependency matrix. If a particular column of the dependency matrix contains only a single "1", then the failure can be isolated by the corresponding sensor. On the other hand, multiple "1's" in a column indicate that the sensor forms an ambiguity group of failures. This means that this sensor can capture multiple failure modes and cannot isolate between them. Based on the dependencies, the dependency matrix can further be reduced to minimize the number of ambiguities and to increase the number of isolated failures. The sensors that did not capture any changes can be removed from the dependency matrix.

Next, the process flow 400 then proceeds to block 415 where the system level detection and isolation algorithm defines the data classes for each component. As discussed earlier, the faults in other sub-systems can affect the measurements of sensors corresponding to an otherwise healthy component thereby leading to false alarms. Therefore, the data classes are defined so that the neural networks 372-379 can separate a healthy component even when its sensor data is recording faulty readings. For example, each component can consist of two data classes healthy data and faulty data.

The healthy data class can consist of data sets generated from at least two conditions: a) every component within the air management system 200 is healthy and b) the component under consideration is healthy while some other component within the air management system 200 is faulty. This allows the neural network to understand whether the component is performing in a healthy manner. By adding to the healthy class data generated from other faulty components, the inputs to the component are then faulty and the output of the component appears to be faulty. But, the neural network is able to understand how the component performs in its healthy state and allows the diagnosis system to detect if its performance is healthy/faulty even in the presence of a fault somewhere else in the air management system 200.

The faulty class can consist of only one data set generated from the condition that the component under consideration is faulty while all other components in the air management system 200 are healthy. By defining the classes in this manner for each component, the neural networks 372-379 can be trained to capture the performance of the component and output a binary decision about the health status of each component.

Figure 5:
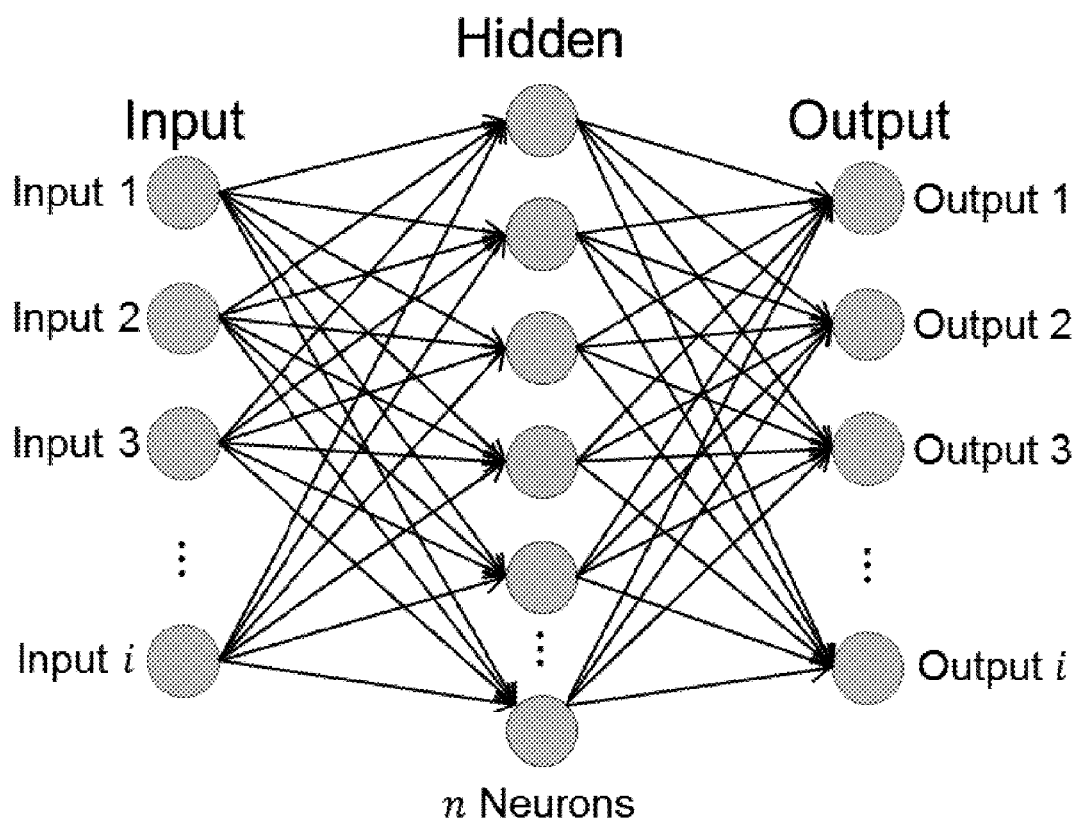
FIG. 5 illustrates a processing system in accordance with an embodiment.

Then, the process flow 400 proceeds to block 420 where the neural networks are trained. That is, as noted above, the neural networks 372-379 are black box models that are used to classify and fit data sets. Three layered neural networks 372-379 are considered here, as shown in FIG. 5, with an input layer, a hidden layer and an output layer. The neurons in these layers are connected by edges that carry weights that are trained so that the input data into the neural networks will generate the desired output. The neural networks 372-379 are used to classify if the nodes of the diagnostic tree are healthy or faulty. The input layer consists of the sensor measurements that are received from the air management system 200. The specific sensors used for each node are determined based on the "1's" within their corresponding row of the dependency matrix. The hidden layer consists of neurons which are connected to the input and output layer through weights. The output layer maps each input measurements to either a 0 or a 1 and has the same number of nodes as the input layer. A 0 represents that the node is healthy while a 1 indicates a fault. Each neural network 372-379 is trained by feeding the two classes of data into the input layer while feeding their corresponding output into the output layer. The number of neurons in the hidden layer varies for each node to determine the best number that produces a well-trained model. Each neural network 372-379 can also be trained using the scaled conjugate gradient back propagation algorithm. For example, to train the neural network 372 for the environmental control system 301, the eight sensors (e.g., sensors A-H) determined in the dependency matrix are used as the inputs. The training data consists of the healthy class and faulty class data described above. The outputs that are used for training consist of a 0 for each healthy class data point and a 1 for the faulty class.

Next, the process flow 400 then proceeds to block 425 where the diagnosis system is executed to detect and isolate faults. That is, once the sensors are selected and the neural networks are constructed and trained for each subsystem and component, the system level detection and isolation algorithm is ready to be executed. This phase uses a top-down approach to find the correct branch of the tree to isolate the faulty component. First, the data received from the diagnosis system is used to isolate the faulty subsystem. This is done by feeding, for example, the 300 seconds of time series data of the selected sensors from the dependency matrix into each of the neural networks 372-373 at the subsystem level. Each neural network 372-373 then outputs a value, either 0 or 1, for each data point fed into the model. Then the average is taken to classify whether the subsystem is healthy or faulty. If the neural network 372 classifies the subsystem 301 as faulty, then the component neural networks 374-376 within the subsystem 301 are used to isolate the failed component using the same approach as for the sub-systems 301 and 302. If the neural network 373 classifies the subsystem as healthy, then the algorithm will not proceed down the branch. This approach detects which subsystem contains the fault and isolates the faulty component while eliminating branches that are healthy since the data used for training captures the performance of the subsystem/component even in the presence of faults elsewhere in the air management system 200.

In one example of implementing the system level detection and isolation algorithm on the generated data sets after training the Neural Networks, 100 Monte Carlo runs were conducted using the 15 data sets of healthy and faulty data presented in Table 1 during each run. These data sets include the healthy system, two shutdown air cycle machines, four second heat exchangers fouling conditions, and four biased sensors for both flow and condenser inlet temperature.

Additionally, additive white Gaussian noise is independently injected into each data set from run to run to mimic real life situations. Each data set is then passed through the diagnostic tree shown in FIG. 3 for the system level detection and isolation algorithm and through each component neural network 372-379 for the exhaustive search.

That is, each neural network 372-379 in the system level detection and isolation algorithm outputs a value between 0 and 1 to indicate which class the data belongs to. If the neural network 372-379 detects a fault, the data set is passed down the tree until a component is isolated with fault. If two or more components detect the fault within a sub-system, then the component associated with the neural networks 374-379 that outputs the value closest to 1 is chosen.

The system level detection and isolation algorithm is tested and validated by comparing its performance with a traditional method of exhaustive search of each component's health. In the traditional method of exhaustive search, each component trains a neural network such that it captures whether the component output is nominal vs off-nominal. In contrast, embodiments of the present invention encapsulate the fact that the component could be generating off-nominal outputs due to fault(s) in other components. In the traditional method of exhaustive search, the neural networks output a value between 0 and 1 to indicate if the component behavior is nominal or off-nominal respectively. If two or more component neural networks detect that the data set is off-nominal, an ambiguity group arises and the faulty component is not isolated. This phenomenon shows that the sub-systems and components have complex interconnection that bring rise to false alarms. The system level detection and isolation algorithm of embodiments of the present invention results indicate that training models that incorporate off-nominal measurements allow for the elimination of false alarms. The diagnostic tree structure allows for the healthy components to be eliminated while reducing the computational complexity and resulting in fault isolation.

Figure 6:
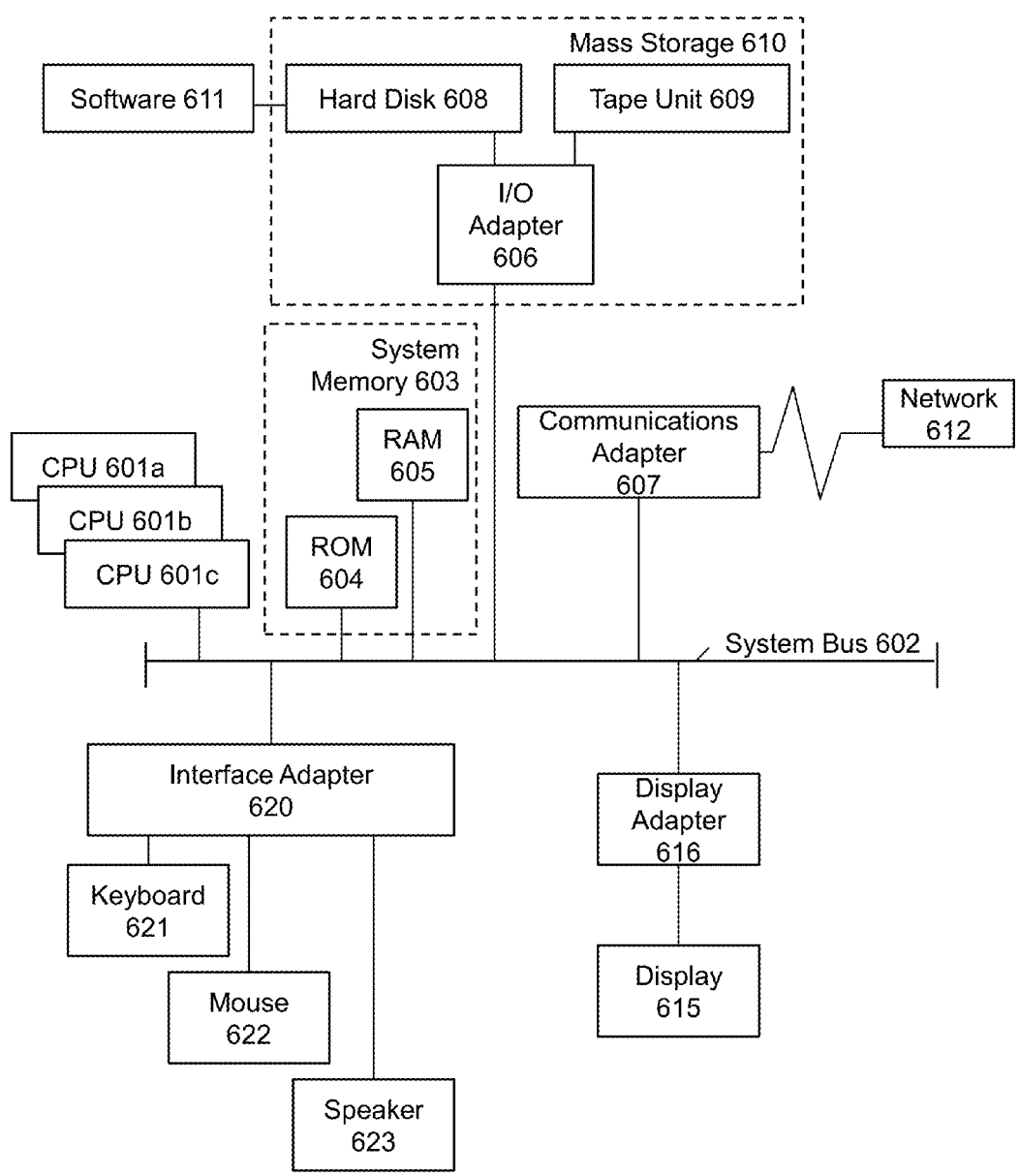
FIG. 6 illustrates a processing system in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). The processors 601, also referred to as processing circuits, are coupled via a system bus 602 to system memory 603 and various other components. The system memory 603 can include read only memory (ROM) 604 and random access memory (RAM) 605. The ROM 604 is coupled to system bus 602 and may include a basic input/output system (BIOS), which controls certain basic functions of the processing system 600. RAM is read-write memory coupled to system bus 602 for use by processors 601.

FIG. 600 further depicts an input/output (I/O) adapter 606 and a network adapter 607 coupled to the system bus 602. I/O adapter 606 may be a small computer system interface (SCSI) adapter that communicates with a hard disk 608 and/or tape storage drive 609 or any other similar component. I/O adapter 606, hard disk 608, and tape storage drive 609 are collectively referred to herein as mass storage 610. Software 611 for execution on processing system 600 may be stored in mass storage 610. The mass storage 610 is an example of a tangible storage medium readable by the processors 601, where the software 611 is stored as instructions for execution by the processors 601 to perform a method, such as the process flows of FIG. 4. Network adapter 607 interconnects system bus 602 with an outside network 612 enabling processing system 600 to communicate with other such systems. A screen (e.g., a display monitor) 615 is connected to system bus 602 by display adapter 616, which may include a graphics controller to improve the performance of graphics intensive applications and a video controller. In one embodiment, adapters 606, 607, and 616 may be connected to one or more I/O buses that are connected to system bus 602 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 602 via an interface adapter 620 and the display adapter 616. A keyboard 621, mouse 622, and speaker 623 can be interconnected to system bus 602 via interface adapter 620, which may include, for example, a Super I/O chip integrating multiple device adapters into a single integrated circuit.

Thus, as configured in FIG. 6, processing system 605 includes processing capability in the form of processors 601, and, storage capability including system memory 603 and mass storage 610, input means such as keyboard 621 and mouse 622, and output capability including speaker 623 and display 615. In one embodiment, a portion of system memory 603 and mass storage 610 collectively store an operating system to coordinate the functions of the various components shown in FIG. 6.

Technical effects and benefits of the diagnosis system include reduction of computational complexity and false alarm rates via the system level detection and isolation algorithm. Thus, the technical effects and benefits of the diagnosis system include early diagnosis strategies that prevent unwanted premature replacement of expensive equipment in which the false alarms are associated with and circumvent off-nominal inputs that drive components beyond nominal operating envelopes and cause over stressed and cascading failures.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reduction of computational complexity and false alarm rates via a system level detection and isolation algorithm, the method executable by a processor coupled to a non-transitory processor readable medium, the method comprising:

accumulating, by the processor, sensor data from a plurality of sensor utilizing a physics based model containing differential equations that describe components and sub-systems within a complex networked system;

selecting, by the system level detection and isolation algorithm executed by the processor, a sub-set of best sensors to capture effects of each failure mode from a plurality of sensors, each sensor being associated with at least one of the components and the sub-systems within the complex networked system, wherein the system level detection and isolation algorithm utilizes a diagnostic tree to systematically isolate faults within the complex networked system to provide early diagnosis strategies that prevent unwanted premature replacement of equipment in which the false alarm rates are associated with and to circumvent off-nominal inputs that drive components beyond operating envelopes causing over stressed and cascading failures, the diagnostic tree being constructed using a diagnosis system as a first node while the at least one of the components and the sub-systems form sub-nodes at different branches;

defining data classes for each of the components, the data classes including a healthy data class and faulty data class, the data classes enabling a plurality of neural networks to identify a healthy component when associated sensor data includes faulty readings;

training the plurality of neural networks for each subsystem and component within the complex networked system to detect and identify the faults within the sensor data; and in response to the sub-set of best sensors being selected and the plurality of neural networks being trained for each subsystem and component, executing the system level detection and isolation algorithm to detect and isolate the faults within the sensor data by:
outputting, by each of the plurality of neural networks, a value to indicate a data class of a portion of the sensor data corresponding to that neural network; and
if a fault is indicated by the value, passing down the diagnostic tree the portion of the sensor data corresponding to that neural network until at least one component within the complex networked system is isolated, wherein if two or more components are isolated within the complex networked system, then a component associated with a neural network that outputs a value closest to one is identified, wherein the healthy data class of the data classes comprises data sets based on when a component under consideration is healthy while another component within the complex networked system is faulty, wherein the faulty class of the data classes comprises a data set generated from a condition that a component under consideration is faulty while all other components within the complex networked system are healthy.

2. A computer program product, the computer program product comprising a computer readable storage medium having program instructions for reduction of computational complexity and false alarm rates via a system level detection and isolation algorithm embodied therewith, the program instructions executable by a processor to cause the processor to perform:

accumulating sensor data from a plurality of sensor utilizing a physics based model containing differential equations that describe components and sub-systems within a complex networked system;

selecting, by utilizing the system level detection and isolation algorithm, a sub-set of best sensors to capture effects of each failure mode from a plurality of sensors, each sensor being associated with at least one of the components and the sub-systems within the complex networked system, wherein the system level detection and isolation algorithm utilizes a diagnostic tree to systematically isolate faults within the complex networked system to provide early diagnosis strategies that prevent unwanted premature replacement of equipment in which the false alarm rates are associated with and to circumvent off-nominal inputs that drive components beyond operating envelopes causing over stressed and cascading failures, the diagnostic tree being constructed using a diagnosis system as a first node while the at least one of the components and the sub-systems form sub-nodes at different branches;

defining data classes for each of the components, the data classes including a healthy data class and faulty data class, the data classes enabling a plurality of neural networks to identify a healthy component when associated sensor data includes faulty readings;

training the plurality of neural networks for each subsystem and component within the complex networked system to detect and identify the faults within the sensor data; and in response to the sub-set of best sensors being selected and the plurality of neural networks being trained for each subsystem and component, executing the system level detection and isolation algorithm to detect and isolate the faults within the sensor data by:
outputting, by each of the plurality of neural networks, a value to indicate a data class of a portion of the sensor data corresponding to that neural network; and
if a fault is indicated by the value, passing down the diagnostic tree the portion of the sensor data corresponding to that neural network until at least one component within the complex networked system is isolated, wherein if two or more components are isolated within the complex networked system, then a component associated with a neural network that outputs a value closest to one is identified.

* * * * *